US008308569B2

(12) United States Patent
Carroll et al.

(10) Patent No.: US 8,308,569 B2
(45) Date of Patent: Nov. 13, 2012

(54) REWARD FOR RESURRECTING TEAMMATE IN A MULTIPLAYER GAME

(75) Inventors: Derek Carroll, Bothell, WA (US); John Howard, Vancouver (CA)

(73) Assignee: Microsoft Corporation, Redmond, WA (US)

( * ) Notice: Subject to any disclaimer, the term of this patent is extended or adjusted under 35 U.S.C. 154(b) by 1008 days.

(21) Appl. No.: 12/119,446

(22) Filed: May 12, 2008

(65) Prior Publication Data

US 2009/0280908 A1    Nov. 12, 2009

(51) Int. Cl.
    *A63F 13/00*    (2006.01)
(52) U.S. Cl. ........................................................ 463/42
(58) Field of Classification Search ........... 463/1, 40–42
    See application file for complete search history.

(56) References Cited

U.S. PATENT DOCUMENTS

| | | |
|---|---|---|
| 6,585,600 B1 | 7/2003 | Nakagawa |
| 6,942,217 B2 | 9/2005 | Cipullo |
| 7,011,582 B1 | 3/2006 | Yamamoto |
| 7,136,617 B2 | 11/2006 | Libby |
| 7,169,051 B1 | 1/2007 | Mossbarger |
| 7,677,974 B2 * | 3/2010 | Van Luchene .................. 463/29 |
| 2003/0075868 A1 * | 4/2003 | Lipps ........................... 273/256 |
| 2004/0143852 A1 | 7/2004 | Meyers |
| 2007/0077985 A1 | 4/2007 | Walker et al. |
| 2007/0087835 A1 | 4/2007 | Van Luchene |
| 2007/0145683 A1 | 6/2007 | Ambrose |
| 2007/0155465 A1 | 7/2007 | Walker et al. |

OTHER PUBLICATIONS

Blizzard Entertainment, Diablo, 1996.*
Bungie Studios for Microsoft, Halo—Combat Evolved, 2003.*
TV Tropes, Everything Fades, retrieved Apr. 23, 2008.*
First Strike: Shadowrun; downloaded Jul. 12, 2007, 9 pages http://news.filefront.com/first-strike-shadowrun/.
Shadowrun (360)—Initial Impressions, downloaded Jul. 12, 2007, 10 pages http://masem.wordpress.com/page/3/.

* cited by examiner

*Primary Examiner* — David L Lewis
*Assistant Examiner* — Eric M Thomas
(74) *Attorney, Agent, or Firm* — Mayer & Williams PC (57) ABSTRACT

Teamwork in a multiplayer video game is encouraged by rewarding game characters who resurrect killed teammates with spendable cash that may be used to purchase additional capabilities or tools to enhance the players' ability to progress through the game. Resurrected teammates are tied to the game character who performed the resurrections by splitting their future earnings accumulated during gameplay with that game character. If a resurrected game character goes on to resurrect other teammates then he will be entitled to a portion of the future earnings of those other resurrected teammates. But the resurrected teammate will also give a portion of those earnings to the original game character who resurrected him in the first place. A resurrection chain is thus created in which game characters can be resurrected and go on to resurrect other teammates while sharing earnings with other game characters that are above them in the chain using a pyramid payment system.

20 Claims, 8 Drawing Sheets

REWARD FOR RESURRECTING TEAMMATE IN A MULTIPLAYER GAME

BACKGROUND

Computer and video games have matured from the likes of "Pong" into epic adventures having rich storylines, photorealistic graphics, and complex interaction systems, thereby allowing players to immerse themselves in the alternative reality that is emulated by the video game. As used herein, video games may include, but are not limited to, any game played on a data processing device. Examples of video games may include computer games, game console games (e.g., playable on the Microsoft Xbox®, Sony PlayStation®, and/or Nintendo® 64 and Wii brand game consoles), coin-operated or token-operated arcade games, portable gaming device games (e.g., playable on the PlayStation Portable ("PSP"®), Nintendo Game Boy and DS™, mobile phones, smartphones, personal digital assistants, etc.), or other software-driven games that are played on personal computers ("PCs").

Video games come in many genres, such as first-person shooters ("FPS"), role-playing games ("RPG"), simulation, sports, strategy, and driving, to name a few. Each video game is not necessarily limited to a single genre, and may indeed encompass multiple genres. An RPG generally refers to a game in which each participant assumes the role of a character in the game (such as an adventurer, monster, or other game character) that can interact within the game's virtual world. A character controlled by a player/user is commonly referred to as a game character.

In the FPS genre, the display screen typically provides a first person point of view, e.g., as if the player is viewing the video game's virtual world through the eyes of the character the player is controlling. Popular FPS games include the HALO®, DOOM®, QUAKE®, and Half-Life® franchises. FPS games are very popular, in part because they are particularly well-suited to multiplayer game play.

In multiplayer play, each participant controls a game character within the virtual environment, and the participants either work alone or in teams to complete their objective(s) for a particular game. Multiplayer FPS games may provide different objectives in various game modes, thus providing a variety of game play types to participants. Some known multiplayer game modes include every-man-for-himself, every-team-for-itself, capture the flag, assault, and king of the hill. The every-man-for-himself format, referred to in the HALO franchise as Slayer mode, and referred to in the QUAKE franchise as Deathmatch mode, refers to a multiplayer game format in which each participant tries to kill all other participants in the graphically simulated virtual environment, for example, within a specific period of time.

Every-team-for-itself refers to a multiplayer game where groups of participants attempt to kill competing groups of participants in the graphically simulated virtual environment.

In capture the flag, the video game simulates a flag in the virtual environment, and teams compete to capture the flag from an initial position and return the flag to a home base of the capturing team. In the assault game mode, teams attempt to penetrate a home base of competing teams and plant a bomb or flag in the competing team's base.

Finally, in king of the hill, players or teams attempt to control a specific location for a preset period of time. The first player or team to control the specific location for that preset period of time wins. Each of the above game modes may have various modifications and settings that can be customized from one game to the next.

The wide availability of Internet connectivity has fueled the popularity of multiplayer video gaming as players can use their on-line connection to locate other players and then participate in a common game. In the multiplayer video game, players can typically see and interact with game characters controlled by players, even if the other players are physically located in another state or country. While multiplayer games can be terrifically entertaining, teamwork among players is often overlooked. Players can often get caught up in personal goals and lose sight of the overall goal of a team. This can often reduce the quality of the gameplay for the players and ultimately reduce the popularity of a given game title.

This Background is provided to introduce a brief context for the Summary and Detailed Description that follow. This Background is not intended to be an aid in determining the scope of the claimed subject matter nor be viewed as limiting the claimed subject matter to implementations that solve any or all of the disadvantages or problems presented above.

SUMMARY

Teamwork in a multiplayer video game is encouraged by rewarding game characters who resurrect killed teammates to bring them back to life during the gameplay with spendable cash that may be used to purchase additional capabilities or tools to enhance the players' ability to progress through the game. Resurrected teammates are tied to the game character who performed the resurrections by splitting their future earnings accumulated during gameplay with that game character. If a resurrected game character goes on to resurrect other teammates then he will be entitled to a portion of the future earnings of those other resurrected teammates. But the resurrected teammate will also give a portion of those earnings to the original game character who resurrected him in the first place. This process can continue throughout the gameplay so that a resurrection chain is created in which game characters can be resurrected and go on to resurrect other teammates while sharing earnings with other game characters that are above them in the chain using a pyramid payment system. The game characters towards the top of a resurrection chain can thus collect significant amounts of cash merely by resurrecting other teammates even if they do not do much else to earn income during the gameplay.

In various illustrative examples, game characters earn cash during gameplay according to their actions, for example, by killing enemies and resurrecting fallen teammates and so on. The better they perform, the more cash they can earn. Gameplay may be organized into matches that comprise rounds. At the beginning of each round, game characters can purchase from among magical abilities, technology, and weapons depending on the amount of money they have on hand. The purchases can be used to assist the game characters during gameplay to enable them to be more successful and earn more cash and avoid getting killed. At the beginning of a match, a player might only be able to afford one magical ability and a simple, or default, weapon. But as the rounds progress, game characters can typically accumulate a host of magical abilities, technology, and weapons.

The ability to resurrect fallen teammates is a magical ability that is invoked when a player casts a spell. Once resurrected, all earnings generated in a round by a resurrected game character (called the "slave") are split on a 50-50 basis with the game character performing the resurrecting (called the "master"). This earnings splitting arrangement is continued as slave game characters may themselves become masters when they resurrect other fallen teammates. In the event a master game character is killed, all the slave game characters in his resurrection chain will slowly "bleed out" and lose their fighting abilities, and eventually die unless they are resurrected by another game character. This aspect provides an additional incentive for a game character to protect the game character who resurrected him to further promotes teamwork in the video game.

The ability to resurrect a fallen teammate through the resurrection spell will typically require the presence of the teammate's body. Enemies can remove the ability to cast the resurrection spell by "clearing the body," by continuing to shoot it until it disappears. If this occurs, the game character becomes permanently dead in the round and cannot be resurrected.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DESCRIPTION OF THE DRAWINGS

Like reference numerals indicate like elements in the drawings. Elements are not drawn to scale unless otherwise indicated.

DETAILED DESCRIPTION

Figure 1:
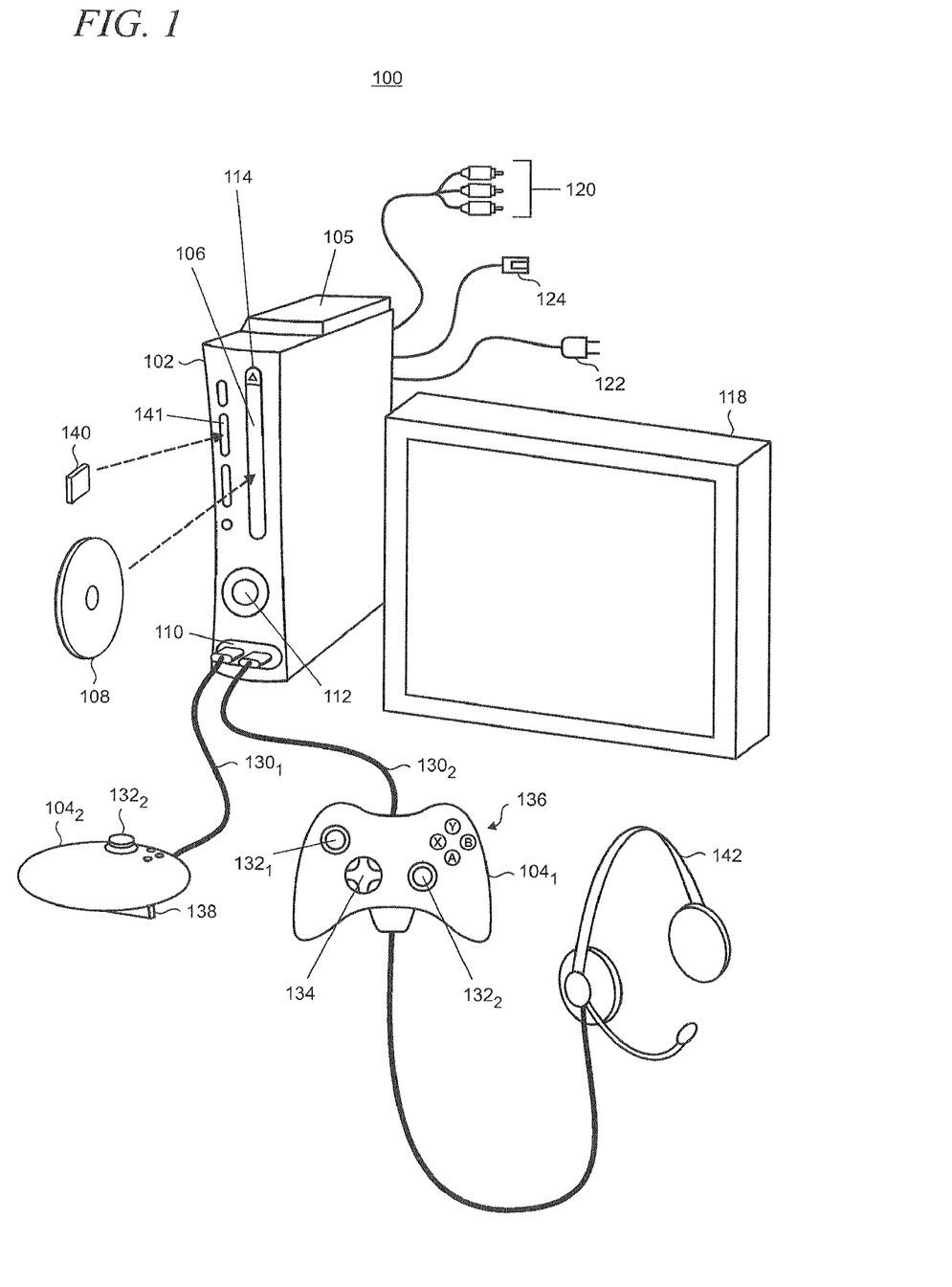
FIG. 1 shows an illustrative gaming system that may be used to implement one or more of the features of the arrangement described herein.

FIG. 1 illustrates an example of a gaming system 100 on which computer games, video games, and/or other electronic games (collectively referred to herein as video games) may be played. The gaming system 100 is only one example of a suitable gaming system and is not intended to suggest any limitation as to the scope of use or functionality of the features described herein. Neither should the gaming system 100 be interpreted as having any dependency or requirement relating to any one or combination of components illustrated in the illustrative operating gaming system 100.

Aspects described herein are operational with numerous other general purpose or special purpose computing system environments or configurations. Examples of well-known computing systems, environments, and/or configurations that may be suitable for use include, but are not limited to, PCs, server computers, portable and hand-held devices such as personal digital assistants ("PDAs"), mobile phones, smart phones, handheld game devices, tablet PCs or laptop PCs, media centers, multiprocessor systems, microprocessor-based systems, set-top boxes, programmable consumer electronics, network PCs, minicomputers, mainframe computers, electronic game consoles, distributed computing environments that include any of the above systems or devices, and the like.

Aspects herein may be described in the general context of computer-executable instructions, such as program modules, being executed by a computer. Generally, program modules include routines, programs, objects, components, data structures, etc., that perform particular tasks or implement particular abstract data types. The features described herein may also be practiced in distributed computing environments where tasks are performed by remote processing devices that are linked through a communications network. In a distributed computing environment, program modules may be located in both local and remote computer storage media including memory storage devices.

The gaming system 100 may include a game console 102 and multiple controllers, as represented by controllers $104_1$ and $104_2$. The game console 102 is equipped with a removably attachable hard disk drive 105 and a portable media drive 106 that supports various forms of portable storage media as represented by optical storage disc 108. Examples of suitable portable storage media include DVD (digital versatile disc), CD-ROM (compact disc—read only memory), game discs, and so forth.

Game console 102 has slots 110 on its front face to support up to two controllers, although the number and arrangement of slots may be modified. A power button 112 and an eject button 114 are also positioned on the front face of the game console 102. The power button 112 switches power to the game console and the eject button 114 alternately opens and closes a tray of the portable media drive 106 to allow insertion and extraction of the storage disc 108.

Game console 102 may connect to a television 118 or other display via A/V interfacing cables 120. A power cable 122 provides power to the game console. Game console 102 may further be configured with broadband network capabilities, as represented by the cable or modem connector 124 to facilitate access to a network, such as the Internet.

Each controller 104 may be coupled to the game console 102 via a wired or wireless interface. In the illustrated implementation, the controllers are USB (Universal Serial Bus) compatible and are connected to the console 102 via respective USB cables $130_1$ and $130_2$. The controllers 104 may be equipped with any of a wide variety of user interaction mechanisms. In this example, each controller 104 is equipped with two thumbsticks $132_1$ and $132_2$, a D-pad (directional pad) 134, buttons 136 (e.g., 'A', 'B', 'X', 'Y'), and two triggers 138 (although only one trigger is shown in the drawing). These mechanisms are merely representative, and other known gaming mechanisms may be substituted for or added to those shown in FIG. 1.

A memory unit 140 may be inserted into a memory unit reader 141 in the game console 102 to provide additional and portable storage. In this example, up to two memory units may be supported by the game console 102. Portable memory units enable users to store game parameters and user accounts, and port them for play on other consoles. A headset 142 may be connected to the controller 104 or game console 102 to provide audio communication capabilities. Headset 142 may include a microphone for audio input and one or more speakers for audio output.

Gaming system 100 is capable of playing, for example, games, music, and videos. With the different storage offerings, titles can be played from the hard disk drive or the portable media 108 in drive 106, from an online source, or from a memory unit 140. For security, in some embodiments executable code can only be run from the portable media 108. A sample of what gaming system 100 is capable of playing includes game titles played from CD and DVD discs, from the hard disk drive, or from an online source, digital music played from a CD in the portable media drive 106, from a file on the hard disk drive (e.g., Windows Media Audio ("WMA") format), or from online streaming sources, and digital audio/video played from a DVD disc in the portable media drive 106, from a file on the hard disk drive (e.g., Active Streaming Format), or from online streaming sources.

Figure 2:
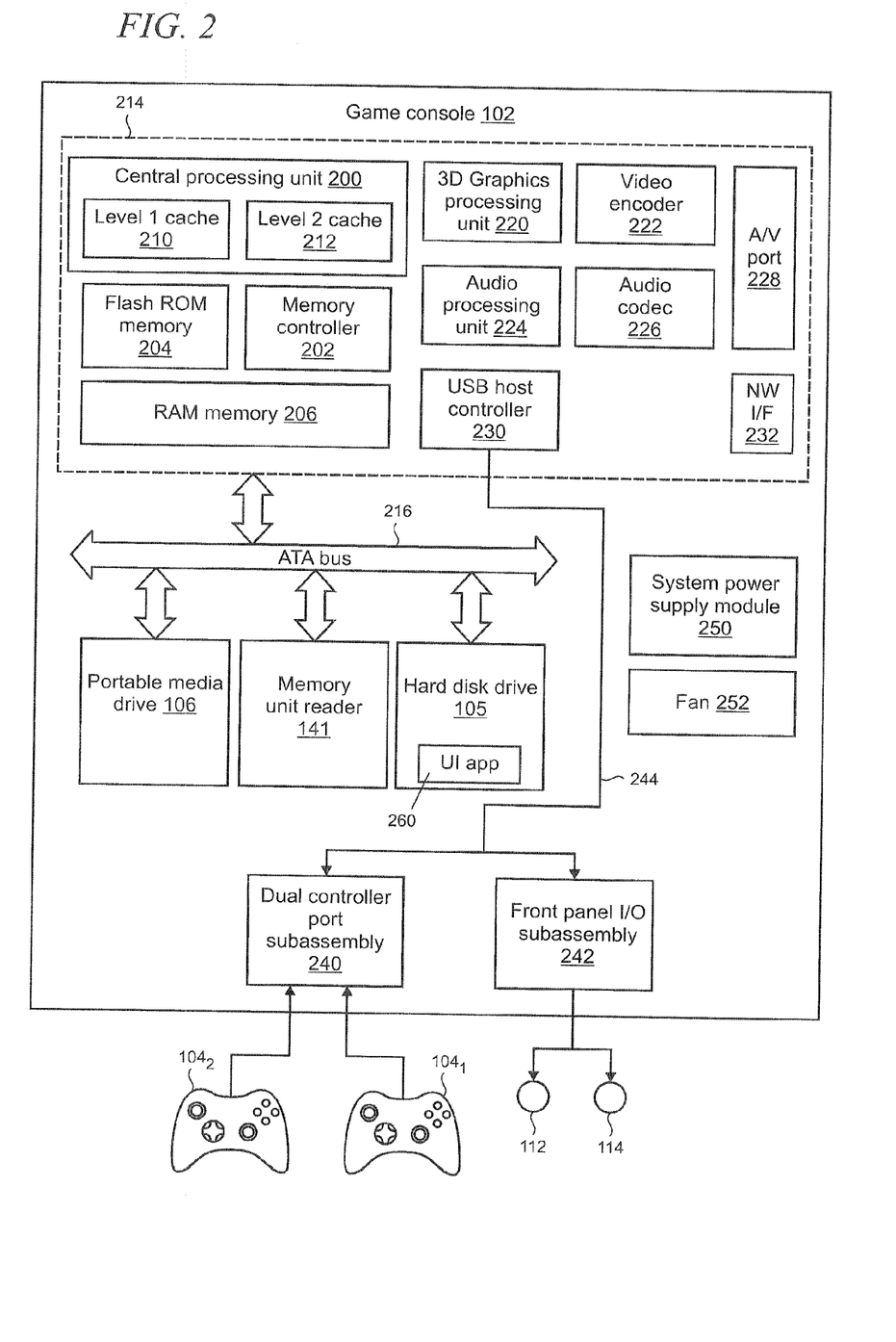
FIG. 2 shows a functional block diagram of the gaming system shown in FIG. 1.

FIG. 2 shows functional components of the gaming system 100 in more detail. The game console 102 has a central processing unit ("CPU") 200 and a memory controller 202 that facilitates processor access to various types of memory, including a flash ROM (Read Only Memory) 204, a RAM (Random Access Memory) 206, the hard disk drive 105, the memory unit reader 141, and the portable media drive 106. The CPU 200 is equipped with a level 1 cache 210 and a level 2 cache 212 to temporarily store data and hence reduce the number of memory access cycles, thereby improving processing speed and throughput.

The CPU 200, memory controller 202, and various memory devices are interconnected via one or more buses, including serial and parallel buses, a memory bus, a peripheral bus, and a processor or local bus using any of a variety of bus architectures. By way of example, such architectures can include an Industry Standard Architecture ("ISA") bus, a Micro Channel Architecture ("MCA") bus, an Enhanced ISA ("EISA") bus, a Video Electronics Standards Association ("VESA") local bus, and a Peripheral Component Interconnects ("PCI") bus also known as a Mezzanine bus.

As one suitable implementation, the CPU 200, memory controller 202, ROM 204, and RAM 206 are integrated onto a common module 214. In this implementation, ROM 204 is configured as a flash ROM that is connected to the memory controller 202 and a ROM bus (not shown). RAM 206 is configured as multiple DDR SDRAM (Double Data Rate Synchronous Dynamic RAM) that is independently controlled by the memory controller 202 via separate buses (not shown). The hard disk drive 105 and portable media drive 106 are connected to the memory controller via the PCI bus and an ATA (Advanced Technology Attachment) bus 216.

A 3D graphics processing unit 220 and a video encoder 222 form a video processing pipeline for high speed and high resolution graphics processing. Data is carried from the graphics processing unit 220 to the video encoder 222 via a digital video bus (not shown). An audio processing unit 224 and an audio codec (coder/decoder) 226 form a corresponding audio processing pipeline with high fidelity and stereo processing. Audio data is carried between the audio processing unit 224 and the audio codec 226 via a communication link (not shown). The video and audio processing pipelines output data to an A/V (audio/video) port 228 for transmission to the television or other display. In the illustrated implementation, the video and audio processing components 220-228 are mounted on the module 214.

Also implemented on the module 214 are a USB host controller 230 and a network interface 232. The USB host controller 230 is coupled to the CPU 200 and the memory controller 202 via a bus (e.g., PCI bus) and serves as host for the peripheral controllers $104_1$ and $104_2$. The network interface 232 provides access to a network (e.g., Internet, home network, etc.) and may be any of a wide variety of various wired or wireless interface components including an Ethernet card, a modem, a Bluetooth module, a cable modem, and the like.

The game console 102 has a dual controller port subassembly 240 which supports the game controllers $104_1$ and $104_2$. A front panel I/O subassembly 242 supports the functionality of the power button 112 and the eject button 114, as well as any LEDs (light emitting diodes) or other indicators exposed on the outer surface of the game console. The subassemblies 240 and 242 are coupled to the module 214 via one or more cable assemblies 244.

A system power supply module 250 provides power to the components of the gaming system 100. A fan 252 cools the circuitry within the game console 102.

The game console 102 implements a uniform media portal model that provides a consistent user interface and navigation hierarchy to move users through various entertainment areas. The portal model offers a convenient way to access content from multiple different media types—game data, audio data, and video data—regardless of the media type inserted into the portable media drive 106.

To implement the uniform media portal model, a console user interface ("UI") application 260 is stored on the hard disk drive 105. When the game console is powered on, various portions of the console application 260 are loaded into RAM 206 and/or caches 210 and 212 and executed on the CPU 200. The console application 260 presents a graphical user interface that provides a consistent user experience when navigating to different media types available on the game console.

The gaming system 100 may be operated as a standalone system by simply connecting the system to a television or other display. In this standalone mode, the gaming system 100 allows one or more players to play games, watch movies, or listen to music. However, with the integration of broadband connectivity made available through the network interface 232, the gaming system 100 may further be operated as a participant in a larger network gaming community. This network gaming environment is described next.

Figure 3:
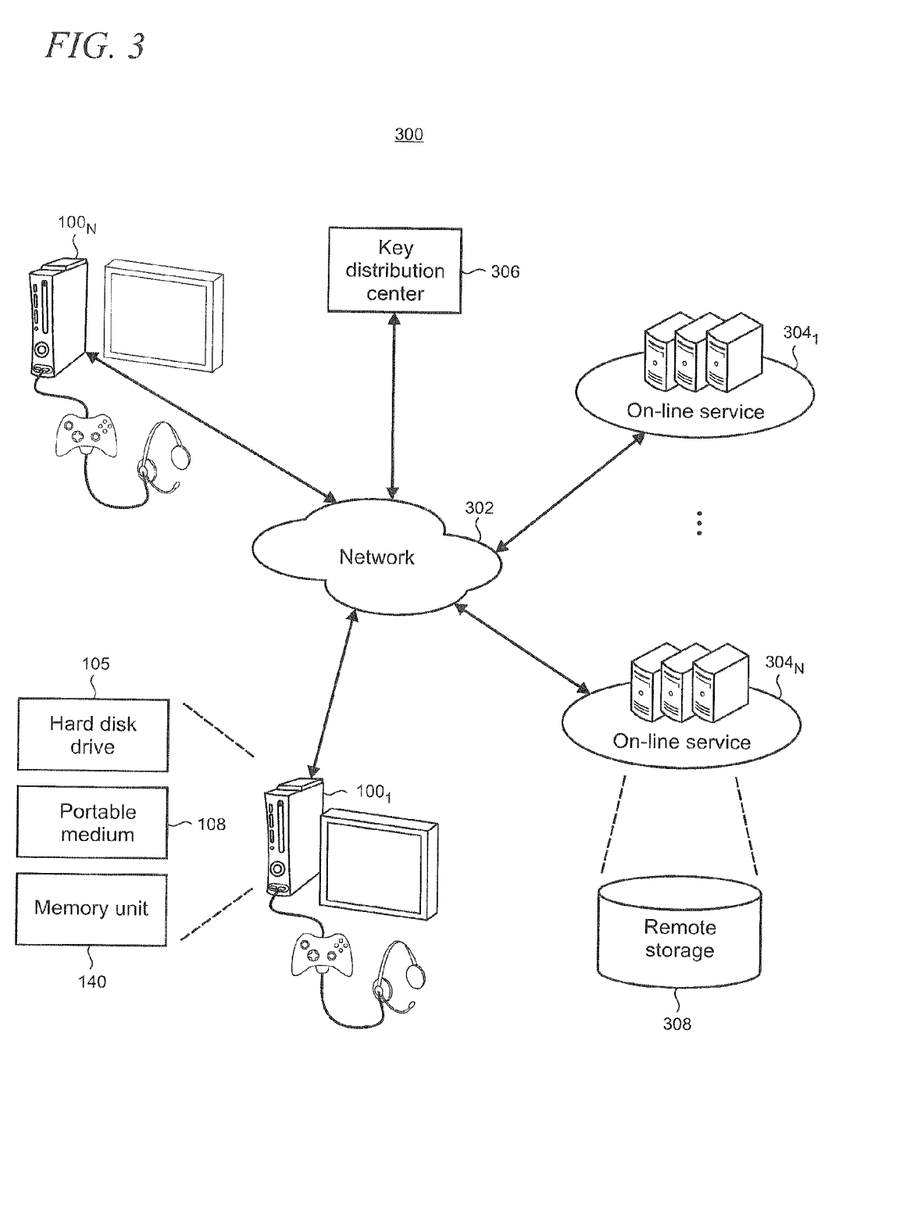
FIG. 3 shows a functional block diagram of an illustrative networked gaming system.

FIG. 3 shows an exemplary network gaming environment 300 that interconnects multiple gaming systems $100_{1 \ldots N}$ via a network 302. The network 302 represents any of a wide variety of data communications networks. It may include public portions (e.g., the Internet) as well as private portions (e.g., a residential Local Area Network ("LAN")), as well as combinations of public and private portions. Network 302 may be implemented using any one or more of a wide variety of conventional communications media including both wired and wireless media. Any of a wide variety of communications protocols can be used to communicate data via network 302, including both public and proprietary protocols. Examples of such protocols include TCP/IP (Transport Control Protocol/Internet Protocol), IPX/SPX (Internetwork Packet Exchange/Sequenced Packet Exchange), NetBEUI (NetBIOS Extended User Interface where BIOS stands for Basic Input/Output System), etc.

In addition to gaming systems 100, one or more online services $304_{1 \ldots N}$ may be accessible via the network 302 to provide various services for the participants, such as hosting online games, serving downloadable music or video files, hosting gaming competitions, serving streaming audio/video files, and the like. The network gaming environment 300 may further involve a key distribution center 306 that plays a role in authenticating individual players and/or gaming systems 100 to one another as well as online services 304. The distribution center 306 distributes keys and service tickets to valid participants that may then be used to form games amongst multiple players or to purchase services from the online services 304.

The network gaming environment 300 introduces another memory source available to individual gaming systems 100, namely online storage. In addition to the portable media 108, the hard disk drive 105, and the memory unit(s) 140, the gaming systems 100 can also access data files available at remote storage locations via the network 302, as exemplified by remote storage 308 at online service 304$_N$.

Figure 4:
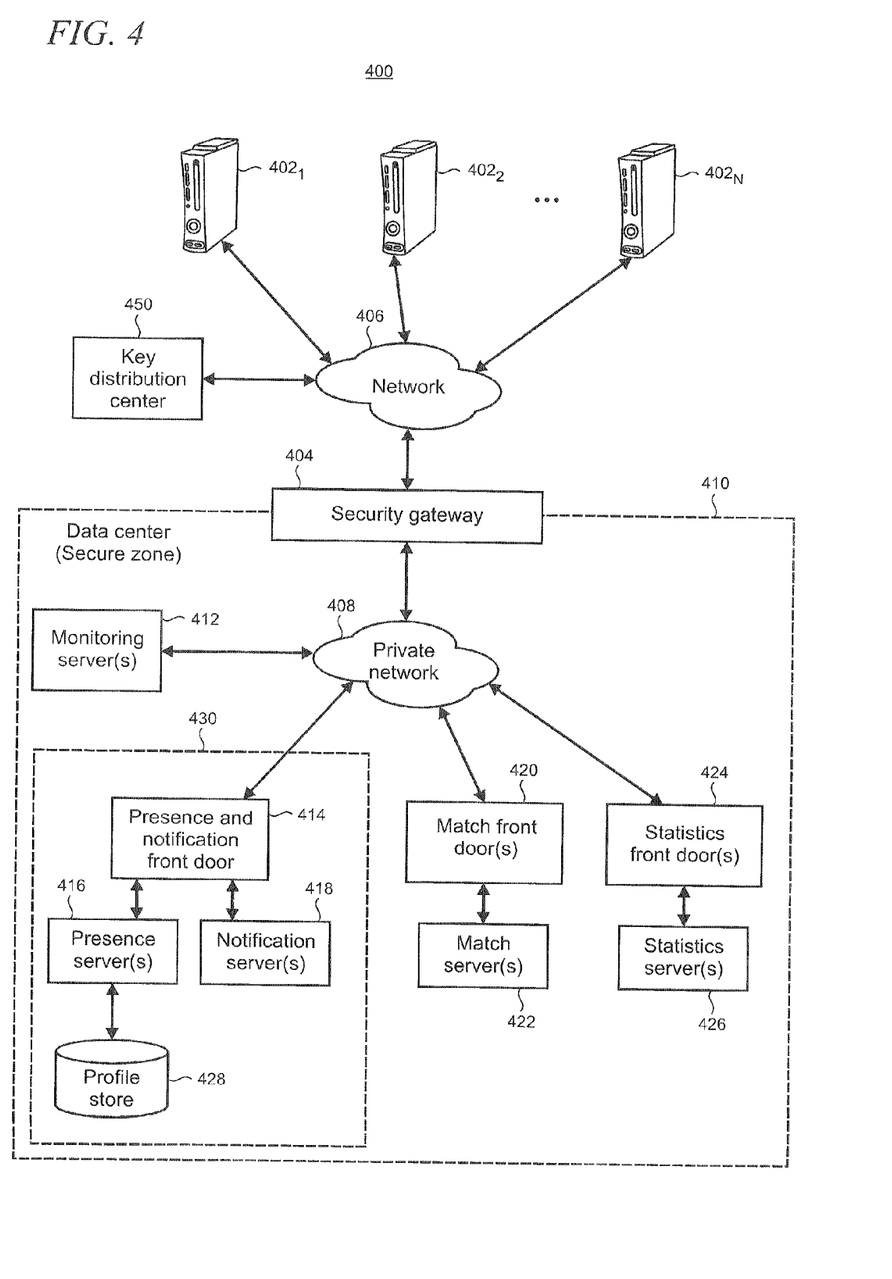
FIG. 4 shows a functional block diagram of an illustrative on-line gaming environment.

FIG. 4 is a block diagram of another illustrative online gaming environment 400, e.g. XBOX® LIVE by Microsoft Corporation. Multiple game consoles 402$_{1, 2 \ldots N}$ are coupled to a security gateway 404 via a network 406. Each game console 402 can be configured in a similar manner as game console 102 of FIG. 1 or FIG. 2, for example. Network 406 represents any one or more of a variety of conventional data communications networks. Network 406 will typically include packet switched networks, but may also include circuit switched networks. Network 406 can include wired and/or wireless portions. In one exemplary implementation, network 406 includes the Internet and may optionally include one or more local area networks and/or wide area networks ("WANs"). At least a part of network 406 is a public network, which refers to a network that is publicly-accessible.

In some situations, network 406 includes a LAN (e.g., a home network), with a routing device situated between game console 402 and security gateway 404. This routing device may perform network address translation ("NAT"), allowing the multiple devices on the LAN to share the same IP address on the Internet, and to operate as a firewall to protect the device(s) on the LAN from access by malicious or mischievous users via the Internet.

Security gateway 404 operates as a gateway between public network 406 and a private network 408. Private network 408 can be any of a wide variety of conventional networks, such as a local area network. Private network 408, as well as other devices discussed in more detail below, is within a data center 410 that operates as a secure zone. Data center 410 is made up of trusted devices that communicate using trusted communications. Thus, encryption and authentication within secure zone 410 is not necessary. The private nature of network 408 refers to the restricted accessibility of network 408 such that access to network 408 is limited to only certain individuals (e.g., restricted by the owner or operator of data center 410).

Security gateway 404 is a cluster of one or more security gateway computing devices. These security gateway computing devices collectively implement security gateway 404. Security gateway 404 may optionally include one or more conventional load balancing devices that operate to direct requests to be handled by the security gateway computing devices to appropriate ones of those computing devices. This directing or load balancing is performed in a manner that attempts to balance the load on the various security gateway computing devices approximately equally (or alternatively in accordance with some other criteria).

Also within data center 410 are: one or more monitoring servers 412, one or more presence and notification front doors 414, one or more presence servers 416, one or more notification servers 418, and a profile store 428 (collectively implementing a presence and notification service or system 430), one or more match front doors 420 and one or more match servers 422 (collectively implementing a match service), and one or more statistics front doors 424 and one or more statistics servers 426 (collectively implementing a statistics service). The servers 416, 418, 422, and 426 provide services to game consoles 402, and thus can be referred to as service devices. Other service devices may also be included in addition to, and/or in place of, one or more of the servers 416, 418, 422, and 426. Additionally, although only one data center is shown in FIG. 4, alternatively, multiple data centers may exist with which game consoles 402 can communicate. These data centers may operate independently, or alternatively may operate collectively (e.g., to make one large data center available to the game consoles 102 and 402).

Game consoles 402 are situated remotely from data center 410, and may access data center 410 via network 406. A game console 402 desiring to communicate with one or more devices in the data center logs in to the data center and establishes a secure communication channel between the game console 402 and security gateway 404. Game console 402 and security gateway 404 encrypt and authenticate data packets being passed back and forth, thereby allowing the data packets to be securely transmitted between them without being understood by any other device that may capture or copy the data packets without breaking the encryption. Each data packet communicated from game console 402 to security gateway 404, or from security gateway 404 to game console 402, can have data embedded therein. This embedded data is referred to as the content or data content of the packet. Additional information may also be inherently included in the packet based on the packet type (e.g., a heartbeat packet).

The secure communication channel between a game console 402 and security gateway 404 is based on a security ticket. Game console 402 authenticates itself and the current user(s) of console 402 to a key distribution center 450 and obtains, from key distribution center 450, a security ticket. Game console 402 then uses this security ticket to establish the secure communication channel with security gateway 404. In establishing the secure communication channel with security gateway 404, the game console 402 and security gateway 404 authenticate themselves to one another and establish a session security key that is known only to that particular game console 402 and the security gateway 404. This session security key is used to encrypt data transferred between the game console 402 and the security gateway 404, so no other devices (including other game consoles 402) can read the data. The session security key is also used to authenticate a data packet as being from the security gateway 404 or game console 402 that the data packet alleges to be from. Thus, using such session security keys, secure communication channels can be established between the security gateway 404 and the various game consoles 402.

Once the secure communication channel is established between a game console 402 and the security gateway 404, encrypted data packets can be securely transmitted between the two. When the game console 402 desires to send data to a particular service device in data center 410, the game console 402 encrypts the data and sends it to security gateway 404 requesting that it be forwarded to the particular service device(s) targeted by the data packet. Security gateway 404 receives the data packet and, after authenticating and decrypting the data packet, encapsulates the data content of the packet into another message to be sent to the appropriate service via private network 408. Security gateway 404 determines the appropriate service for the message based on the requested service(s) targeted by the data packet.

Similarly, when a service device in data center 410 desires to communicate data to a game console 402, the data center sends a message to security gateway 404, via private network 408, including the data content to be sent to the game console 402 as well as an indication of the particular game console 402 to which the data content is to be sent. Security gateway 404 embeds the data content into a data packet, and then encrypts the data packet so it can only be decrypted by the particular game console 402 and also authenticates the data packet as being from the security gateway 404.

Although discussed herein as primarily communicating encrypted data packets between security gateway 404 and a game console 402, alternatively some data packets may be partially encrypted (some portions of the data packets are encrypted while other portions are not encrypted). Which portions of the data packets are encrypted and which are not can vary based on the desires of the designers of data center 410 and/or game consoles 402. For example, the designers may choose to allow voice data to be communicated among consoles 402 so that users of the consoles 402 can talk to one another—the designers may further choose to allow the voice data to be unencrypted while any other data in the packets is encrypted. Additionally, in another alternative, some data packets may have no portions that are encrypted (that is, the entire data packet is unencrypted). It is also noted that, even if a data packet is unencrypted or only partially encrypted, all of the data packet can still be authenticated.

Each security gateway device in security gateway 404 is responsible for the secure communication channel with typically one or more game consoles 402, and thus each security gateway device can be viewed as being responsible for managing or handling one or more game consoles. The various security gateway devices may be in communication with each other and communicate messages to one another. For example, a security gateway device that needs to send a data packet to a game console that it is not responsible for managing may send a message to all the other security gateway devices with the data to be sent to that game console. This message is received by the security gateway device that is responsible for managing that game console and sends the appropriate data to that game console. Alternatively, the security gateway devices may be aware of which game consoles are being handled by which security gateway devices—this awareness may be explicit, such as each security gateway device maintaining a table of game consoles handled by the other security gateway devices, or alternatively, implicit, such as determining which security gateway device is responsible for a particular game console based on an identifier of the game console.

Monitoring server(s) 412 operate to inform devices in data center 410 of an unavailable game console 402 or an unavailable security gateway device of security gateway 404. Game consoles 402 can become unavailable for a variety of different reasons, such as a hardware or software failure, the console being powered-down without logging out of data center 410, the network connection cable to console 402 being disconnected from console 402, other network problems (e.g., the LAN that the console 402 is on malfunctioning), etc. Similarly, a security gateway device of security gateway 404 can become unavailable for a variety of different reasons, such as hardware or software failure, the device being powered-down, the network connection cable to the device being disconnected from the device, other network problems, etc.

Each of the security gateway devices in security gateway 404 is monitored by one or more monitoring servers 412, which detect when one of the security gateway devices becomes unavailable. In the event a security gateway device becomes unavailable, monitoring server 412 sends a message to each of the other devices in data center 410 (servers, front doors, etc.) that the security gateway device is no longer available. Each of the other devices can operate based on this information as it sees fit (e.g., it may assume that particular game consoles being managed by the security gateway device are no longer in communication with data center 410 and perform various clean-up operations accordingly). Alternatively, only certain devices may receive such a message from the monitoring server 412 (e.g., only those devices that are concerned with whether security gateway devices are available).

Security gateway 404 monitors the individual game consoles 402 and detects when one of the game consoles 402 becomes unavailable. When security gateway 404 detects that a game console is no longer available, security gateway 404 sends a message to monitoring server 412 identifying the unavailable game console. In response, monitoring server 412 sends a message to each of the other devices in data center 410 (or alternatively only selected devices) that the game console is no longer available. Each of the other devices can then operate based on this information as it sees fit.

Presence server(s) 416 holds and processes data concerning the status or presence of a given user logged in to data center 410 for online gaming. Notification server(s) 418 maintains multiple notification queues of outgoing messages destined for a player logged in to data center 410. Presence and notification front door 414 is one or more server devices that operate as an intermediary between security gateway 404 and servers 416 and 418. One or more load balancing devices (not shown) may be included in presence and notification front door 414 to balance the load among the multiple server devices operating as front door 414.

Security gateway 404 communicates messages for servers 416 and 418 to the front door 414, and the front door 414 identifies to which particular presence server 416 or particular notification server 418 the message is to be communicated. By using front door 414, the actual implementation of servers 416 and 418, such as which servers are responsible for managing data regarding which users, is abstracted from security gateway 404. Security gateway 404 can simply forward messages that target the presence and notification service to presence and notification front door 414 and rely on front door 414 to route the messages to the appropriate one of server(s) 416 and server(s) 418.

Match server(s) 422 holds and processes data concerning the matching of online players to one another. An online user is able to advertise a game available for play along with various characteristics of the game (e.g., the location where a football game will be played, whether a game is to be played during the day or at night, the user's skill level, etc.). These various characteristics can then be used as a basis to match up different online users to play games together. Match front door 420 includes one or more server devices (and optionally a load balancing device(s)) and operates to abstract match server(s) 422 from security gateway 404 in a manner analogous to front door 414 abstracting server(s) 416 and server(s) 418.

Statistics server(s) 426 holds and processes data concerning various statistics for online games. The specific statistics used can vary based on the game designer's desires (e.g., the top ten scores or times, a world ranking for all online players of the game, a list of users who have found the most items or spent the most time playing, etc.). Statistics front door 424 includes one or more server devices (and optionally a load balancing device(s)) and operates to abstract statistics server(s) 426 from security gateway 404 in a manner analogous to front door 414 abstracting server(s) 416 and server(s) 418.

Thus, it can be seen that security gateway 404 operates to shield devices in the secure zone of data center 410 from the untrusted public network 406. Communications within the secure zone of data center 410 need not be encrypted, as all devices within data center 410 are trusted. However, any information to be communicated from a device within data center 410 to a game console 402 passes through security gateway cluster 404, where it is encrypted in such a manner that it can be decrypted by only the game console 402 targeted by the information.

One or more features described herein may be embodied in computer-executable instructions (i.e., software) stored in RAM 206, non-volatile memory 108, 105, 308, or any other resident memory on game console 102. Generally, software modules include routines, programs, objects, components, data structures, etc. that perform particular tasks or implement particular abstract data types when executed by a processor in a computer or other device. The computer executable instructions may be stored on a computer readable medium such as one or more hard disks 105, portable storage media 108 (e.g., CD-ROM, DVD, disk, etc.), solid state memory, RAM 206, etc. As will be appreciated by one of skill in the art, the functionality of the software modules may be combined or distributed as desired in various embodiments. In addition, the functionality may be embodied in whole or in part in firmware or hardware equivalents such as application specific integrated circuits ("ASIC"), field programmable gate arrays ("FPGA"), and the like.

Figure 5:
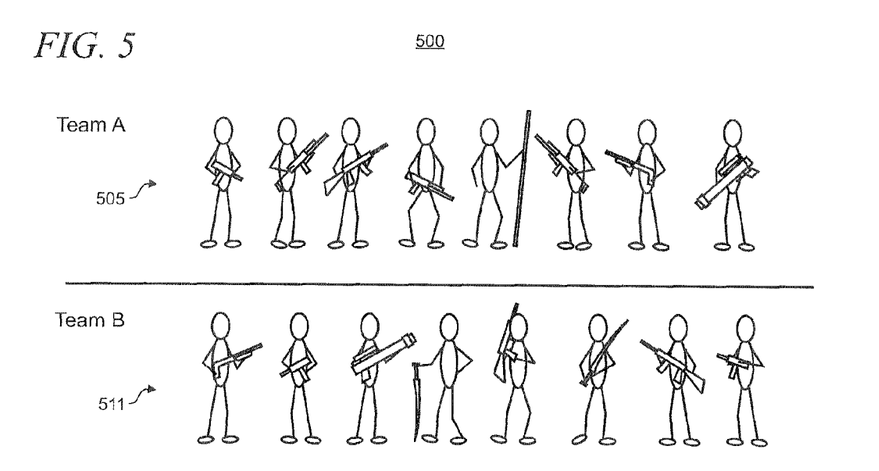
FIG. 5 shows an illustrative gaming arrangement in which players are split into teams.

Turning now to FIG. 5, shown is an illustrative set of game characters 500 split between "Team A" 505 and "Team B" 511 that may take part, for example, in an illustrative multiplayer video game such as an RPG or FPS game, or a game that uses a combination of both game genres. In this example, the teams 505 and 511 each include eight game characters that are controllable by respective human video game players. In alternative implementations, some of the characters on a team may be computer-controlled (i.e., non-game characters). It is also noted that the use of eight game characters on a team is merely illustrative and that other numbers of teammates may be used depending on the requirements of a specific implementation.

The game characters 500 on the teams 505 and 511 are typically user-definable in some ways. For example, there may be different class types of characters with distinct strengths and weaknesses from which players may choose to control. Some types of characters may be better able to use technology aids (like "wired reflexes" which makes the game character a lot faster and, if armed with a sword for example, able to deflect incoming bullets), while others are particularly adept at handling conventional weapons like guns, knives, and swords. As described below in the text accompanying FIGS. 8 and 9, magical abilities are also supported in the multiplayer video game including the ability to resurrect teammates who are killed during the course of gameplay.

Figure 6:
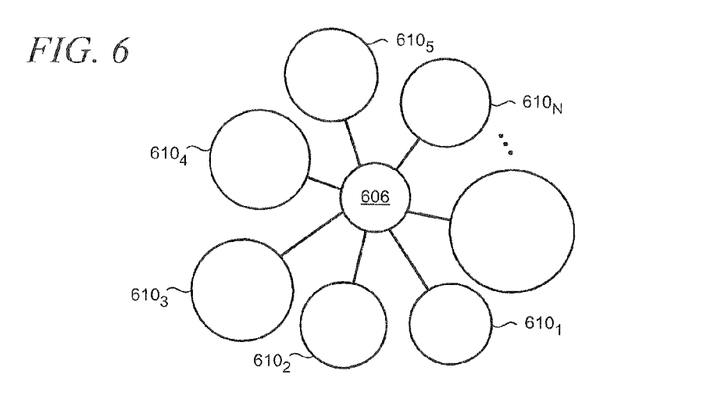
FIG. 6 shows an illustrative gaming arrangement in which gameplay is conducted using a variety of maps.

Players will typically make character selections, form teams, and decide which type of game to play (e.g., capture the flag; attrition, where one team tries to kill all the players on the other team; etc.) in a game lobby 606 as shown in FIG. 6. Once these initial selections are made, the gameplay itself will typically take place on one of several available maps $610_{1, 2 \ldots N}$ which are entered from the game lobby 606. Typically the maps will differ in size and topology (as represented by the differently sized circles in FIG. 6) to thus present varied environments or "worlds" in which to play the video game.

Figure 7:
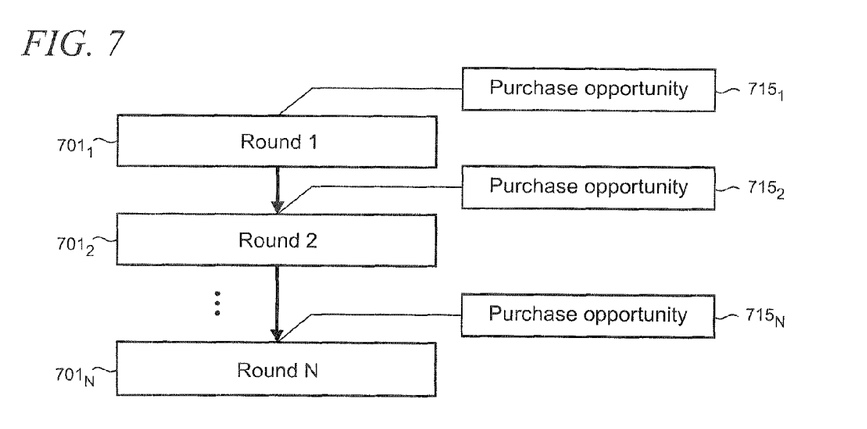
FIG. 7 shows an illustrative gaming arrangement in which gameplay is conducted in matches that are divided into rounds and purchase opportunities are provided to players prior to each round.

In this example, as shown in FIG. 7, each match between the teams 505 and 511 is divided into rounds $701_{1, 2 \ldots N}$. Rounds can be any length of time, but in this example they are typically around four to five minutes. A game character's performance in each round earns that player money that can be spent on performance aids, or donated to other teammates. Generally, the more enemy kills, etc., that a game character makes during a round, the more spendable cash can be earned. In addition, as described below, cash can be generated for a game character by resurrecting dead teammates and then taking a portion of their earnings during the round.

At the beginning of each round $701_{1, 2 \ldots N}$ is a respective purchasing opportunity $715_{1, 2 \ldots N}$ that is given to each of the game characters 500 on the teams 505 and 511. At the beginning of the first round $701_1$, the game characters 500 start with some set level of spendable cash. This set level may vary, in some cases, according to the character type chosen for example, or according to some other criteria. Thus, some of character types which may be stronger or endowed with other abilities may be given less spendable cash at the outset of the match compared with other characters. This ability to select the particular attributes or balance of strengths/weaknesses applied to a given character is often considered an enjoyable part of the gameplay.

At the beginning of a match between the teams 505 and 511 a particular game character might only be able to afford to purchase a few aids. However, as the rounds 701 progress and a game character earns more cash through performance, a host of magical abilities, technology, and weapons can often be accumulated. In addition, purchased items may be set in some scenarios so that they remain with a game character throughout a match, even if the game character is killed in a given round (i.e., the purchased items are still available to the game character when starting at the next round).

During a purchase opportunity 715 at a beginning of a round 701, a game character is presented with a graphical user interface that is displayed by the game console 102 on the television 118 which shows a player's available spendable cash and a number of categories of items from which purchases may be made. An illustrative menu 800 provided by a user interface is shown in the screenshot in FIG. 8. As indicated by reference numeral 810, one of the game characters 500 (named here "Player 1") has $3235 in cash that may be spent on items in categories of weapons, magic, technology, and team, as respectively indicated by reference numerals 815, 820, 825, and 830. The weapons category 815 comprises weapons such as guns and swords, and the like. The technology category 825 comprises a variety of devices such as devices that enable a user to see through walls, laser sights, and gliders. It is emphasized that these purchasable items are intended to be illustrative and that the particular items utilized in a given implementation can vary as may be required to meet specific needs.

Figure 8:
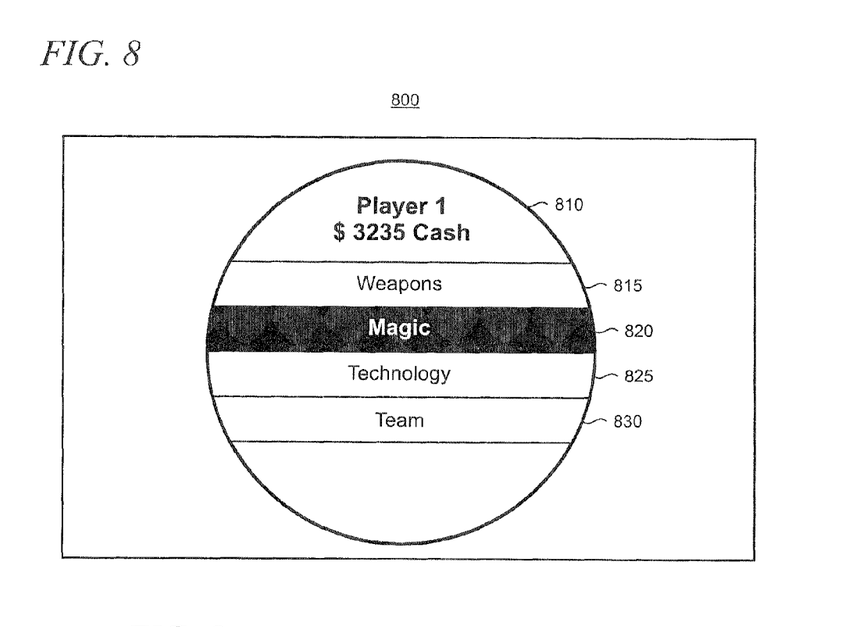
FIG. 8 shows a screenshot of an illustrative menu provided by a graphical user interface for engaging in purchases prior to the beginning of a round.
Figure 9:
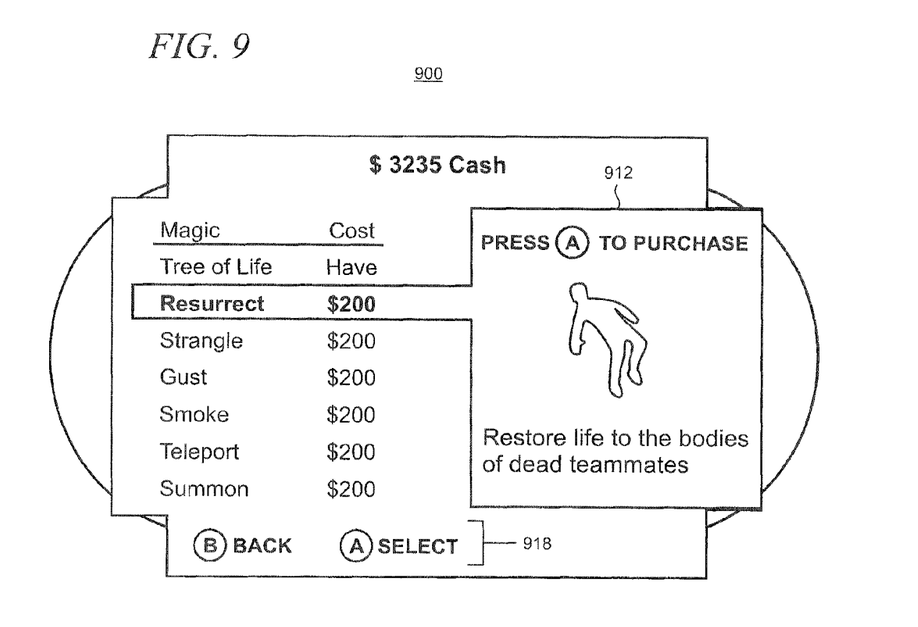
FIG. 9 shows a screenshot of an illustrative menu for engaging in purchases of certain types of magic spells.

The magic category 820, when selected from the menu 800, opens a menu 900 as shown in the screenshot in FIG. 9 from which various types of magical abilities (i.e., "spells") may be purchased by a game character prior to the start of each round. The menu 900 here lists a number of illustrative magical abilities including "Resurrect" which, when highlighted by the player as shown, provides a window 912 that provides a brief description of the magical ability (i.e., "restore life to the bodies of dead teammates"). Window 912 also includes purchasing instructions which the player can follow to effectuate the purchase of the Resurrect magical ability. In this example, the player can press the "A" button 136 on the controller 104 to make the purchase, or press the "B" button to go back to the previous menu 800 as collectively indicated by reference numeral 918.

Figure 10:
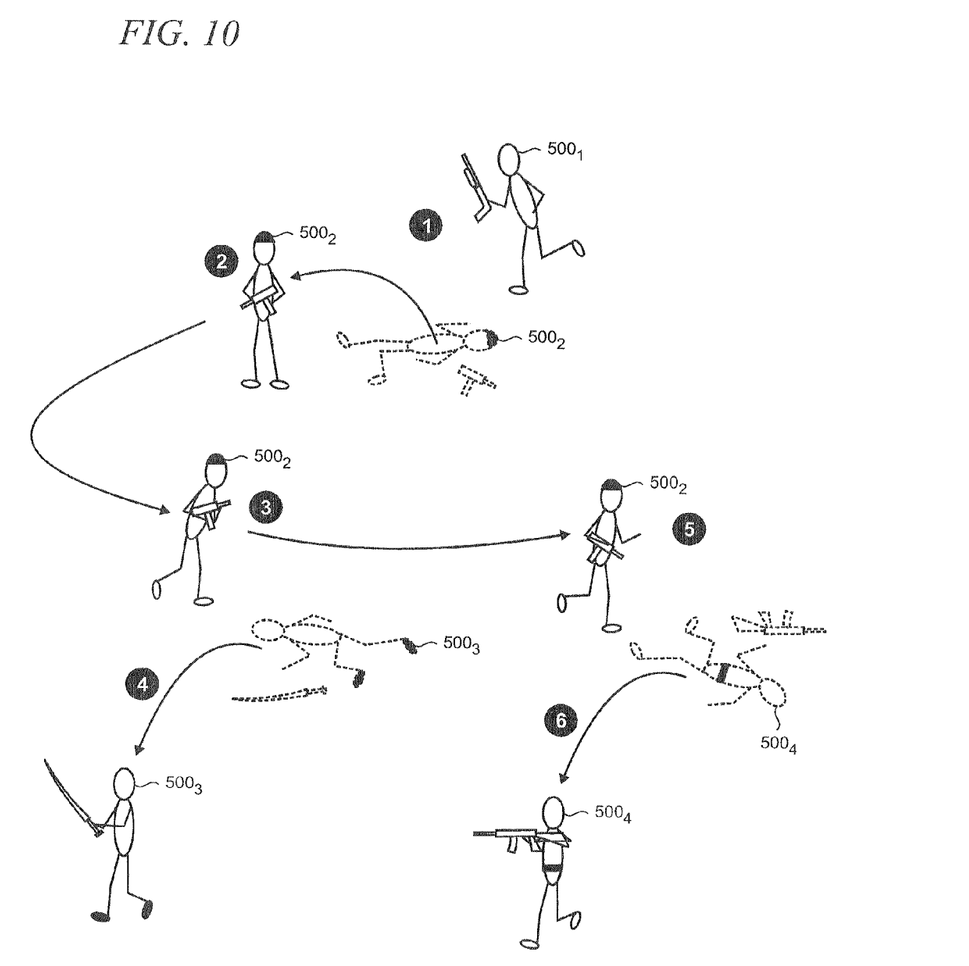
FIG. 10 shows an illustrative scenario in which a resurrection chain is implemented when one game character resurrects another game character who then goes on to resurrect other game characters.

Once a game character has purchased the magical ability to resurrect dead teammates, the ability may be used in one or more of the rounds 701 during gameplay. In particular, the ability to resurrect dead teammates may be used to create "chains" of resurrected teammates, as shown in FIG. 10. In this example, a game character $500_1$ has previously purchased the Resurrect magical ability. Coming across a dead teammate $500_2$ wearing a black hat (1), the game character $500_1$ casts the Resurrect magical spell to resurrect game character $500_2$ and bring him back to life (2). Game character $500_1$ is deemed the master game character and game character $500_2$ the slave.

The resurrected game character $500_2$ engages in gameplay and then comes across a teammate $500_3$ wearing black shoes (3). Game character $500_2$ casts the Resurrect magic spell to bring game character $500_3$ back to life (4). In some cases, the game character $500_2$ needs to have previously purchased the Resurrect magical ability during a purchasing opportunity 715 to have his own independent ability to resurrect dead teammates. Alternatively, the game character $500_2$ may inherit the ability from the master game character $500_1$ and would not need to have the independent ability.

After resurrecting game character $500_3$, the game character $500_2$ becomes the master for game character $500_3$ who becomes the slave. However, while a master for game character $500_3$, the game character $500_2$ remains the slave to game character $500_1$.

The previously resurrected game character $500_2$ continues to engage in gameplay and then comes across another dead teammate $500_4$ who is wearing a black belt (5). Game character $500_2$ casts another Resurrect magic spell to bring game character $500_4$ back to life (6). As above, after resurrecting game character $500_4$, the game character $500_2$ becomes the master for game character $500_4$ while remaining the slave to game character $500_1$.

In this example, the master-slave relationship is arranged to provide incentives for players to work cooperatively as teammates because when a master game character is killed, the slave to that master will also die. In some cases, the death of the slave will be immediate upon the death of the master. Alternatively, the slave game character can die more slowly (e.g., "bleed out") over time while losing fighting prowess and ability. In that case, the slave game character will eventually die unless resurrected again by a teammate. Thus, for example, if the master game character $500_2$ is later killed during gameplay in the current round, then both slaves to that master (i.e., game characters $500_3$ and $500_4$) will also die or bleed out over time unless resurrected again. If the master game character $500_1$ is killed, then all the slave came characters $500_2$, $500_3$, and $500_4$ will also die or eventually bleed out and die unless resurrected again. Having a game character's fate tied to a master game character will tend to make players be protective of their masters in their chain of resurrection as it is in their own interests to do so.

Financial incentives are provided to game characters to cooperate with their teammates. This is implemented through use of a pyramid payment system (i.e., a pyramid "scheme") by which master game characters receive a split of the earnings of all their slave game characters in a resurrection chain. An illustrative resurrection chain 1100 is shown in block diagram form in FIG. 11 which corresponds to the example resurrection chain scenario shown in FIG. 10. A game character in a tier of the resurrection chain 1100 is a master to a game character slave below it according to the dependency arrows shown. Accordingly, game character $500_1$ is the master of game character $500_2$. Game character $500_2$ is the master of both game character $500_3$ and game character $500_4$.

Figure 11:
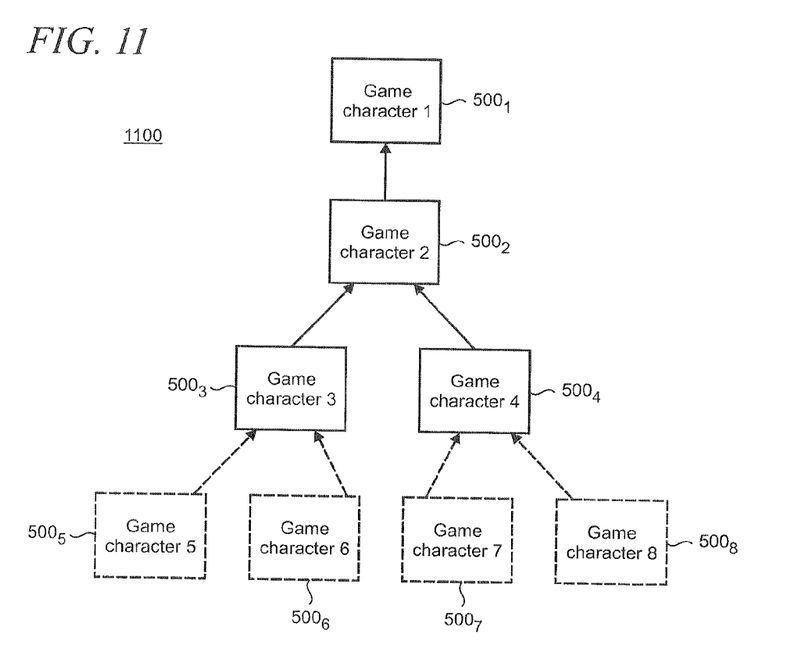
FIG. 11 shows a block diagram of an illustrative resurrection chain.

Although not demonstrated in the scenario shown in FIG. 10, it is possible for the resurrection chain 1100 to include all eight game characters on a team (e.g., team 505 or 511) as shown by the dashed rectangles and dependency arrows. For example as shown in FIG. 11, game characters $500_5$ and $500_6$ could be resurrected by game character $500_3$ and become slaves to that master game character. And, game characters $500_7$ and $500_8$ could be slaves to the master game character $500_4$. However, it is emphasized that the configuration of the resurrection chain 1100 could take any of a variety of different shapes with different dependencies in accordance with a given set of actions performed by the game characters during gameplay. For example, it is possible that the resurrection chain 1100 could be very flat with just a couple of tiers where one master game character resurrects many of his teammates. The resurrection chain 1100 might be tall and narrow where there are as many tiers as teammates. Or, there could be virtually any configuration that falls in between these two examples.

Figure 12:
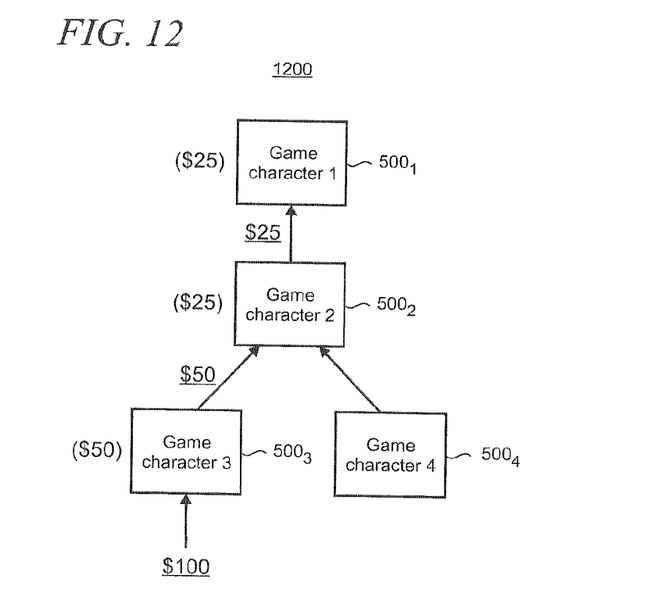
FIG. 12 shows an illustrative distribution of earnings in a resurrection chain using a pyramid payment system.

FIG. 12 shows an illustrative distribution of earnings using a pyramid payment system for a resurrection chain 1200 that corresponds to the illustrative scenario shown in FIG. 10. In this example, it is assumed that game character $500_3$ earns $100 for an action that is performed during a round. As game character $500_3$ is a slave to his master game character $500_2$, the $100 in earnings is split between the two game characters. A 50-50 split is used here which means that game character $500_3$ keeps $50 of the $100 in earnings and gives $50 to his master game character $500_2$ as a reward for the earlier resurrection. It is noted that money that is held by a game character in FIG. 12 is shown in parentheses while money that moves to and from game characters is underlined. It is further noted that the 50-50 split is illustrative and other splits may also be used if desired.

As game character $500_2$ is also himself a slave to game character $500_1$, under the pyramid payment system, the $50 reward received from game character $500_3$ is again split 50-50. The game character $500_2$ keeps $25 and the master game character $500_1$ receives $25 as a reward for resurrecting the game character $500_2$.

Game character $500_1$ will continue to receive payments in the form of a split of the earnings for all the actions of all the slave game characters below him in the chain until the current round ends. Accordingly, it is possible to accumulate money that can be spent at the beginning of the next round merely by resurrecting fallen teammates. In addition, by virtue of being positioned at the top of the resurrection chain 1200, when game character $500_1$ takes actions during the gameplay, the money earned for those actions is not split with any others as game character $500_1$ is not beholden to any other game characters.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A system for implementing a resurrection chain in a multiplayer game environment, comprising:

a game console having a capability for executing programming to implement multiplayer gameplay;

a data store accessible by the game console over a network, the data store comprising a plurality of profiles associated with unique game characters, the profiles tracking information associated with the resurrection chain which is configured for identifying master game characters and slave game characters;

memory in communication with the game console bearing computer-readable instructions, said computer-readable instructions enabling game characters to resurrect dead teammates to implement the resurrection chain, a game character performing a resurrection being a master game character and a resurrected teammate being a slave game character, the resurrection chain arranging master game characters and slave game characters in hierarchical tiers so that a particular game character is simultaneously a master to a first game character and a slave to a second game character; and memory in communication with the game console bearing computer-readable instructions, said computer-readable instructions splitting earnings of the slave game characters with the master game characters.

2. The system of claim 1 in which the network comprises at least one of public network infrastructure, a portion of which include the Internet, or private network infrastructure.

3. The system of claim 1 in which the programming comprises a video game.

4. The system of claim 1 further comprising memory in communication with the game console bearing computer-readable instructions capable of disabling resurrection for dead teammates whose bodies have been cleared from the gameplay.

5. The system of claim 4 in which the bodies are cleared through actions of game characters on an opposing team.

6. The system of claim 1 further comprising memory in communication with the game console bearing computer-readable instructions capable of tying the master game character to the slave game character so that death of the master game character during gameplay results in death of the slave game character.

7. The system of claim 1 in which the death of the slave character occurs over a time interval during which capabilities of the slave character diminish.

8. A computer-readable medium containing instructions which, when executed by one or more processors disposed in an electronic device, perform a method for operating a video game including game characters controlled by players, the method comprising the steps of:

providing a facility for the game characters to be organized into teams;

establishing a resurrection chain among the game characters on a team, the resurrection chain reflecting acts of resurrection performed by game characters to restore life to game characters killed during gameplay, the resurrection chain arranging master game characters and slave game characters in hierarchical tiers so that a particular game character is simultaneously a master to a first game character and a slave to a second game character; and sharing earnings of game characters according to their tier position on the resurrection chain, the earnings being obtained during gameplay as compensation for actions performed in the video game.

9. The computer-readable medium of claim 8 in which the method includes a further step of terminating life of a resurrected game character when a game character performing an act of resurrection is killed during gameplay.

10. The computer-readable medium of claim 8 in which the method includes a further step of providing purchase opportunities in which earnings may be utilized to purchase aids for game characters to progress through the video game.

11. The computer-readable medium of claim 8 in which the facility comprises a game lobby.

12. The computer-readable medium of claim 11 in which the game lobby is accessible over an Internet connection.

13. The computer-readable medium of claim 8 in which the resurrection chain includes master game characters and slave game characters, a game character performing the resurrection being a master game character and a resurrected game character being a slave game character.

14. The computer-readable medium of claim 8 in which the sharing comprises splitting using a pyramid payment system.

15. A method for rewarding teamwork in a multiplayer video game, the method comprising the steps of:

controlling gameplay in the video game so that game characters may earn money for actions performed, the money being spendable to purchase aids to assist the game characters to progress through the gameplay;

providing game characters with an ability to resurrect teammates who are killed during gameplay to bring the teammates back to life, the resurrecting establishing a resurrection chain arranging master game characters and slave game characters in hierarchical tiers so that a particular game character is simultaneously a master to a first game character and a slave to a second game character; and implementing a pyramid payment system for splitting earnings of the resurrected teammates with the game characters who resurrected the resurrected teammates.

16. The method of claim 15 including a further step of providing a user interface to facilitate the purchase of the aids.

17. The method of claim 15 in which the aids comprise one of technology, magic, or weapons.

18. The method of claim 15 in which the gameplay is conducted in rounds and the aids may be purchased prior to the start of each round.

19. The method of claim 15 in which the splitting is performed on a 50-50 basis.

20. The method of claim 15 in which the ability to resurrect teammates is a purchased aid.

* * * * *